United States Patent [19]
Bonomi

[11] 3,753,569
[45] Aug. 21, 1973

[54] PRESSURE VALVE FOR FLUIDS

[76] Inventor: Agostino Bonomi, Via S. Giovanni 3, Polaveno (BS), Italy

[22] Filed: Aug. 9, 1971

[30] Foreign Application Priority Data

Mar. 23, 1971 Italy........................ 5125A/71

[21] Appl. No.: 170,217

[52] U.S. Cl.................. 277/112, 251/214, 277/117, 277/190
[51] Int. Cl. .... F16k 41/04, F16j 15/18, F16j 15/34
[58] Field of Search.................... 277/112, 117, 118, 277/190, 120, 63; 251/214

[56] References Cited
UNITED STATES PATENTS
| | | | |
|---|---|---|---|
| 3,443,816 | 5/1969 | Saleri et al............................ | 277/112 |
| 3,038,693 | 6/1962 | Dumm....................... | 277/112 X |
| 2,895,710 | 7/1959 | Sanctuary........................... | 251/312 |

FOREIGN PATENTS OR APPLICATIONS
| | | | |
|---|---|---|---|
| 1,102,582 | 10/1955 | France............................... | 277/190 |

*Primary Examiner*—Samuel B. Rothberg
*Attorney*—Clario Ceccon

[57] ABSTRACT

In a pressure valve improved sealing means are provided by a collar that is formed integrally with the valve shaft, the collar having two transverse, axially spaced apart surfaces that are smooth and parallel with respect to each other. The first one of a first pair of frusto-conical gaskets are secured to the shaft for rotation together therewith and in abutment with one of the transverse surfaces of the collar. The second one of the first pair of frusto-conical gaskets is secured internally of the sleeve in which the valve shaft is mounted. The inclined surfaces of the first pair of frusto-conical gaskets are in sliding contact with each other. A second pair of frusto-conical gaskets is positioned, in a similar manner on the opposite transverse surface of the valve collar. As with the first pair of frusto-conical gaskets, the second pair is secured respectively to the shaft and to the body of the valve. The inclined surfaces of the second pair of frusto-conical gaskets are also in sliding contact with each other. In the embodiment illustrated in the drawing the inclined surfaces of each pair of gaskets is at an equal and opposite angle to the other. Preferably the gaskets are made of a low friction, resilient material.

6 Claims, 3 Drawing Figures

PRESSURE VALVE FOR FLUIDS

The present invention relates to a valve for fluids and, more specifically, to a valve employed in conjunction with a conventional faucet. The valve comprises a handle inserted in the sleeve of the valve's body and is characterized by an intermediate collar having a smooth and parallel upper and lower surfaces, on which collar there is mounted a first pair of annular seal gaskets having frusto-conical cross-section and positioned between the base of said sleeve and the said lower surface of the collar, and a second pair of annular seal gaskets having frusto-conical cross-section and positioned between the said upper surface of the collar and the terminal of the tightening coupling threaded on the said sleeve.

The two annular gaskets of each pair are coupled to each other in the sense that they are partially seated one into the other, so as to result coordinated along a circumferential inclined common surface and to be sealably slidable with respect to each other.

According to a further characteristic of the invention, of the two pairs of gaskets, that one in each pair which is farther remote from the collar is forcibly mounted on the sleeve of the body of the valve so as to be statically blocked on the inner surface of said sleeve, while the gaskets of each pair adjacent to said collar are, instead, mounted forcibly on the shaft of the handle of the valve so as to be secured thereto and to be able to rotate therewith, thus moving on and with respect to the corrseponding static gaskets mentioned hereabove.

The main object of the present invention is to provide a valve for fluids, particularl a faucet valve, wherein the seal at the shaft of the valve's handle is obtained by means of two pairs of gaskets, suitable made of plastic material, positioend as above described, capable of insuring a constant sealing action even in the event of dilations caused by thermal changes and capable, furthermore, of a frictional sliding acton between themselves while preventing unnecessary wear and tear of the gaskets.

Another object of the invention is to provide means to avoid the frictional sliding of gaskets against metal components of the valve, as it is the case in many present-day faucet valves, and to insure a sealing action both at high and low fluid pressures, because of the partiuclar distribution of the pressure forces due to the frusto-conical structure of the gaskets.

These and other objects will become apparent from the following description of the invention and from the accompanying drawings, in which.

Figure 1:
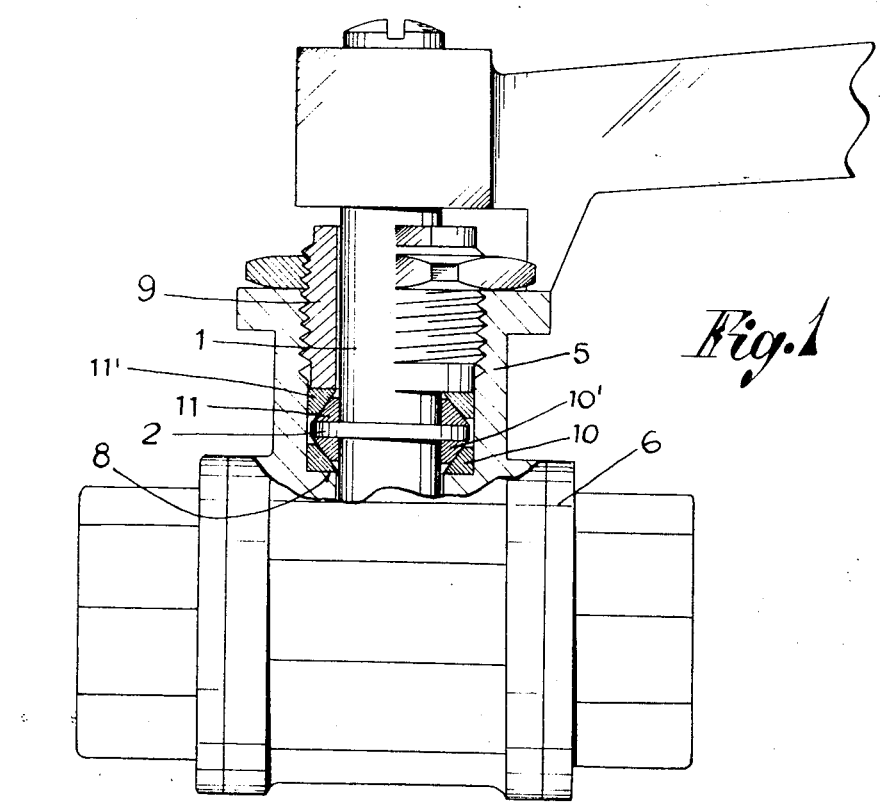
FIG. 1 shows partially cut-away the valve of the invention in assembled condition.
Figure 2:
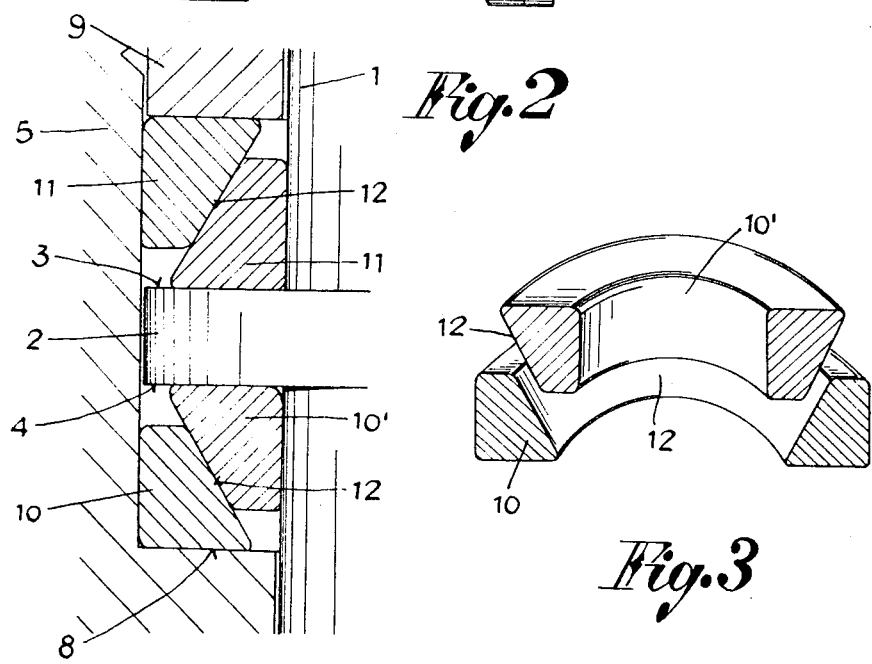
FIG. 2 shows in sectional detail and enlarged the mounting of the gaskets on the shaft of the handle.
Figure 3:
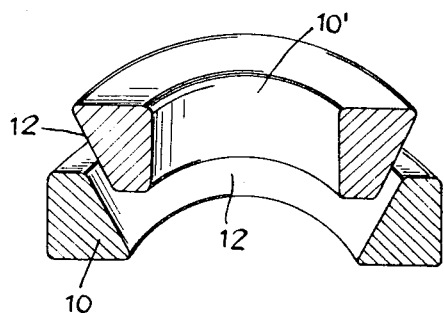
FIG. 3 shows in perspective the cross-section of a pair of gaskets.

The valve of the invention comprises a shaft 1 of the valve's handle on which shaft there is provided an intermediate collar 2 having smooth upper and lowersurvaces 3,4 parallel to each other. The shaft 1, as conventionally already known, is located in a sleeve 5 of the body 6 of the valve adn it is threaded therein. The amount of threading possible is determined by the base or lower ledge 8 of the sleeve 5 and by the sealing coupling 9 threaded on the sleeve itself.

Between the lower ledge 8 of the sleeve 5 and the lower surface 4 of the collar 2 there are positioned two annular gaskets 10–10', frusto-conical in cross-section. Of these, the lower one 10 is forcibly mounted in said sleeve 5 so as to be statically secured to the inner surface of the sleeve and to rest upon said lower ledge 8. The upper gasket 10', instead, is forcibly mounted on the shaft 1 of the handle so as to be rigidly fixed thereto and to be capable of moving therewith while engaging against the lower surface 4 of the collar 2.

Between the upper surface 3 of the collar 2 and the inner extremity of the threaded coupling 9 there is mounted a second pair of annular gaskets 11–11' of frusto-conical cross-section. Of these, the lower gasket 11' is mounted forcibly on the shaft 1 of the valve so as to be secured thereto and to rest against the upper surface 3. The upper gasket 11, instead, is mounted so as to be secured to the inner surface of the sleeve 5 and to be engaged by the threaded coupling 9.

The gaskets 10–11, integrally positioned with respect to the surface of sleeve 5, have an inner diameter larger than that of the shaft 1, so as not to engage the shaft. Conversely, the gaskets 10'–11', mounted on the shaft 1, have an outer diameter smaller than the inner diameter of the sleeve 5.

The lower pair of gaskets 10–10' as well as the upper one 11–11' are so dimensioned as to partially lodge one inside the other and to be in contact with each other along a circumferential, inclined surface 12—12'. The surface 12—12' has the surface inclined in one direction or in the other, with respect tothe vertial axis of the shaft 1, so as to allow the rotational movements of the gaskets mounted on said shaft without interference with the static gaskets secured to the sleeve 5.

The sealing action is, therefore, obtained between gasket and gasket of each pair of gaskets and not between gasket and metal. The sealing force attributable to the threaded coupling 9, as well as any other force originated by pressure changes or by thermal variations, are absorbed by the frusto-conical surfaces of the gaskets, so as to insure constant and perfect sealing.

By virtue, furthermore, of the physical properties of the gaskets themselves, suitably made of plastic material, the friction between gasket and gasket along the contact surface 12—12', during operating of the valve, are greatly minimized and the main cause of gasket wear is practically eliminated, thus increasing substantially the lift of the gaskets.

Finally, worth of notice is the fact that the blocking force existing against the gasekts may be regulated and controlled at any time by controlling the degree of threading of the coupling 9. The two pairs of gaskets are mounted so as to have their respective circumferential sealing, inclined surfaces, preferably, in opposire direction, as shown in the drawings. In this manner, the upper pair of gaskets will be pressed against the coupling 9 as the pressure of the fluid increases, while the lower pair of gaskets will retain sufficient resiliency to return to its original configuration. This is also facilitated by the frusto-conical shape of the gaskets.

I claim:

1. In a pressure valve for fluids, the valve being of the type that includes a handle and a sleeve, a shaft on the handle, the shaft being positioned within the sleeve, improved sealing means comprising, in combination therewith:

a. a collar integral with said shaft, said collar including a pair of smooth surfaces that are positioned in space apart, parellel planes that are perpendicular to the axis of the shaft;

b. a first pair of frusto-conical gaskets telescoped one into the other, the inner one of said first pair of gaskets being secured to the shaft for rotation together therewith and also in abutment with one of said pair of surfaces of said collar, the outer one of said first pair of gaskets being rigidly secured to the inner surface of the sleeve and also in abutment with a transverse wall thereof, the inclined surfaces of said first pair of frusto-conical gaskets being at substantially the same angle and in sliding contact with each other; and c. a second pair of frusto-conical gaskets telescoped one into the other, the inner one of said second pair of gaskets being secured to the shaft for rotation together therewith and also in abutment with the other one of said pair of surfaces of said collar, the outer one of said second pair of gaskets being rigidly secured to the inner surface of the sleeve, and also in abutment with the inner end wall of the threaded coupling, the inclined surfaces of said second pair of frusto-conical gaskets being at substantially the same angle and in sliding contact with each other.

2. The improved sealing means in accordance with claim 1 wherein the inclined surfaces of said first pair of frusto-conical gaskets are at an opposite angle with respect to the inclined surfaces of said second pair of frusto-conical gaskets.

3. The improved sealing means in accordance with claim 1 wherein the inclined surfacse of said first pair of frusto-conical gaskets are at an equal and opposite angle with respct to the inclined surfaces of said second pair of frusto-conical gaskets.

4. The improved sealing means in accordance with claim 1 wherein at least the inclined surfaces of said first and said second pair of frustoconical gaskets are made of plastic to provide a minimum of friction therebetween.

5. The improved sealing means in accordance with claim 1 wherein said first and said second pair of frusto-conical gaskets are made of plastic to provide a minimum of friction therebetween.

6. The improved sealing means in accordance with claim 1 wherein said first and second pair of frusto-conical gaskets are made of a resilient material.

* * * * *